Feb. 24, 1970 H. L. EASTUS 3,497,339

STUD INSERTION APPARATUS FOR COLOR TV BULBS AND METHOD OF INSERTION

Filed Aug. 2, 1967 2 Sheets-Sheet 1

INVENTOR.
HAROLD L. EASTUS
BY D. R. Birchall
& W. A. Schaich
ATTORNEYS

INVENTOR.
HAROLD L. EASTUS
BY D. R. Birchall
& W. A. Schaich
ATTORNEYS

United States Patent Office 3,497,339

Patented Feb. 24, 1970

3,497,339

STUD INSERTION APPARATUS FOR COLOR TV BULBS AND METHOD OF INSERTION

Harold L. Eastus, Muncie, Ind., assignor to Owens-Illinois, Inc., a corporation of Ohio Filed Aug. 2, 1967, Ser. No. 657,956
Int. Cl. C03c *21/00*
U.S. Cl. 65—59 14 Claims

ABSTRACT OF THE DISCLOSURE

An apparatus for inserting metal studs in the glass portion of a cathode ray tube. An apparatus for accurately positioning and effecting a glass to metal seal while supporting the face plate portion of the cathode ray tube from the interior viewing area surface and the exterior surface of the flange. A method of positioning and holding a television face plate in a prescribed position by orienting against the external surface of the flange portion of the face plate.

Figure 1:
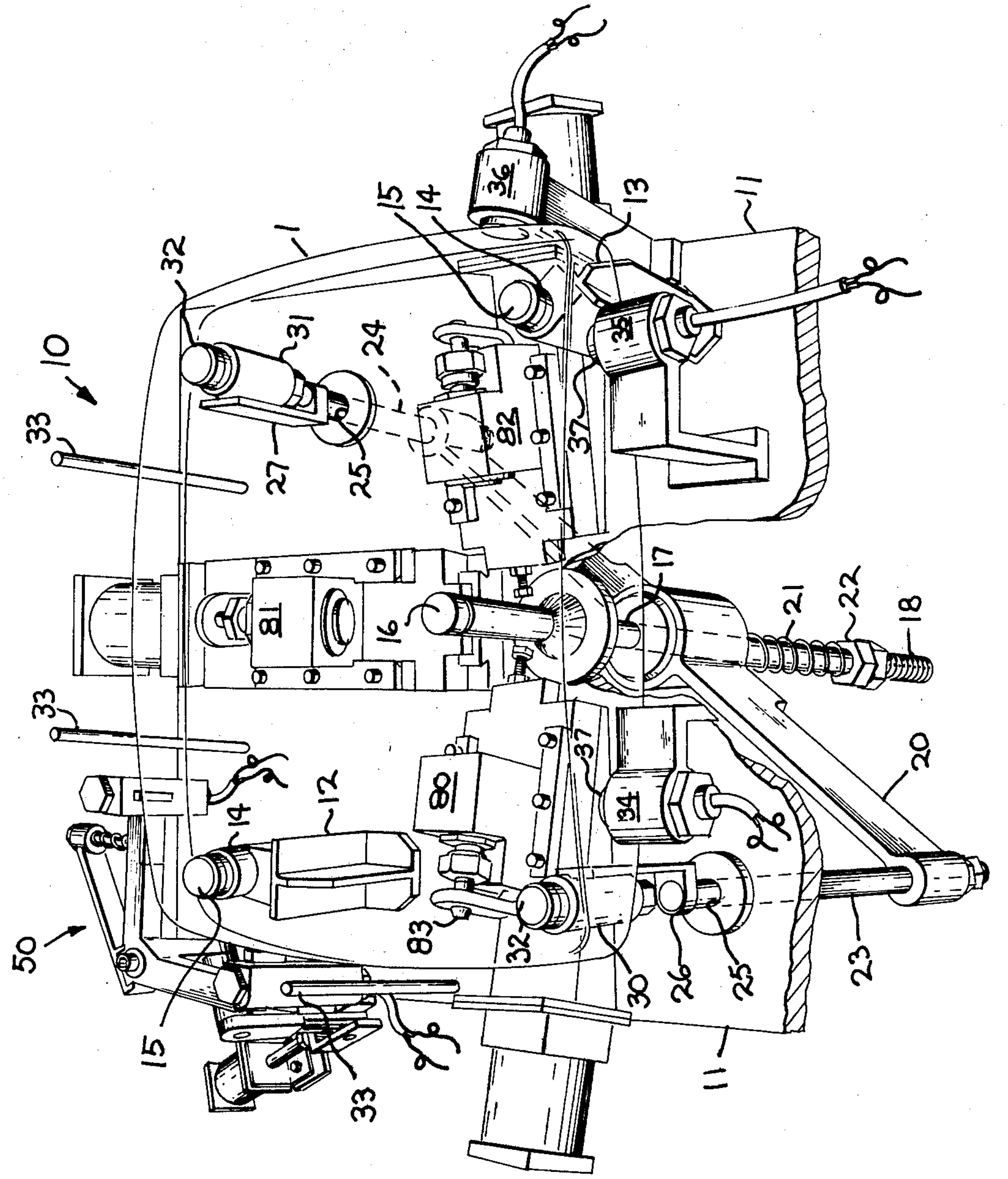

This invention relates to an apparatus and method for inserting metal support studs into the surface of glass articles. In particular, the present invention relates to sealing metal members into glass articles and to fabricating hollow glass articles that have a plurality of stud-like members embedded in the inner surfaces of their sidewalls. By way of example, the hollow glass article may be the light transmitting concavo-convex viewing portion of a television picture tube known as the face plate. The studs are inserted in the interior wall of the flange, that is an integral part of the frontal area or viewing section of the television face plate, to provide support for the aperture mask that is utilized in the creation of polychromatic television.

The metal inserts are designed so that a structural load may be supported therefrom. Other adaptations of the cathode ray tube and for that matter additional glass structural items may equally well be joined into bonded relationship with metallic or nonmetallic studs as taught by this invention. The present invention is described in terms of a television face plate which is adapted to serve as the viewing screen for a color receiving television set. The cathode ray tubes utilized in colored television are equipped with a heavy color-controlling aperture mask or grid that must be retained in close proximity to the interior surface of the viewing screen in extremely precise alignment therewith and also the mask must be supported so that the alignment can be duplicated a number of times during the initial installation of the various phosphor coatings. The present invention is especially applicable to inserting metal studs in the interior walls of television face plates for color television picture tubes that are rectangular or circular in overall configuration when viewed from the front or picture viewing side.

Prior art attempts have been made to solve the problem of accurately inserting a plurality of load supporting metal inserts in the interior surface of the flange portion of color television face plates. An example of the prior art has been disclosed in U.S. Patents Nos. 2,949,702 and 3,021,643 both having their derivation from the same original disclosure and issued in the name of Blanding et al. on Aug. 23, 1960 and Feb. 20, 1962, respectively. The above cited patents relate to method and apparatus for sealing a number of hollow metal studs into the interior wall of the face plate skirt portion after both the inserts and the glass sidewall in the mounting or insertion regions have been suitably heated to a working temperature by the utilization of gas fed burner flames. In the Blanding et al. disclosures, the trapped air within the hollow inserts is relied upon to pneumatically force the metal stud in an outward direction from the glass surface thus producing a filleted contour around the glass-metal interface to provide a strong and reliable seal. Thus it can be readily determined that the above described prior art method would not work if the metal stud were equipped with an axially aligned aperture therethrough. Also, the use of burner flames to heat both the metal inserts and the interior surfaces of the television face plate sidewall, the latter to near plasticity, have encountered the serious problem of loose dirt particles being embedded in the glass adjacent the stud in the form of metallic oxide contamination, which cannot be tolerated in providing stud-like mounting members that are designed to carry the heavy frame of a massive color-controlling structure such as an aperture mask. The prior art disclosures have been directed to heating both the metallic stud and the glass sidewall by the same heat source wherein the flame passed over the surface of the metal stud prior to reaching the glass surface. The prior art has not provided an entirely satisfactory solution to the problem of accurately locating and mounting the metallic stud inserts in a sealed position with the surrounding glass being free from contamination and/or defects.

The present invention is very closely related to patent application Ser. No. 580,959 filed Sept. 21, 1966 wherein the orienting of the face plate is achieved by the so-called internal chucking system. External holding or chucking systems for television face plates were heretofore considered as impractical because high bending stresses were induced in the glass article thus resulting in actual deformities.

With the above problems in mind, it is therefore an object of this invention to provide an apparatus for accurately positioning and holding a television face plate while metal studs are inserted in the flange thereof.

Another object of the present invention is to provide a method for fabricating the face plate member of a color television picture tube envelope by positioning it in substantially a horizontal position and translating it into precise alignment where it is immobilized during the insertion of metal studs in the interior flanges thereof.

An additional object of the present invention is to immobilize a heated hollow-glass television face plate member in a horizontal plane with its flanged edge projecting downwardly and heating a series of inserts interiorly of the face plate both immediately prior to and during forceful embedding of the inserts in the interior surface of the glass flange portion.

Further objects and advantages of the invention will be readily apparent from the following description when taken in conjunction with the drawings wherein the mechanical features are clearly shown.

Figure 2:
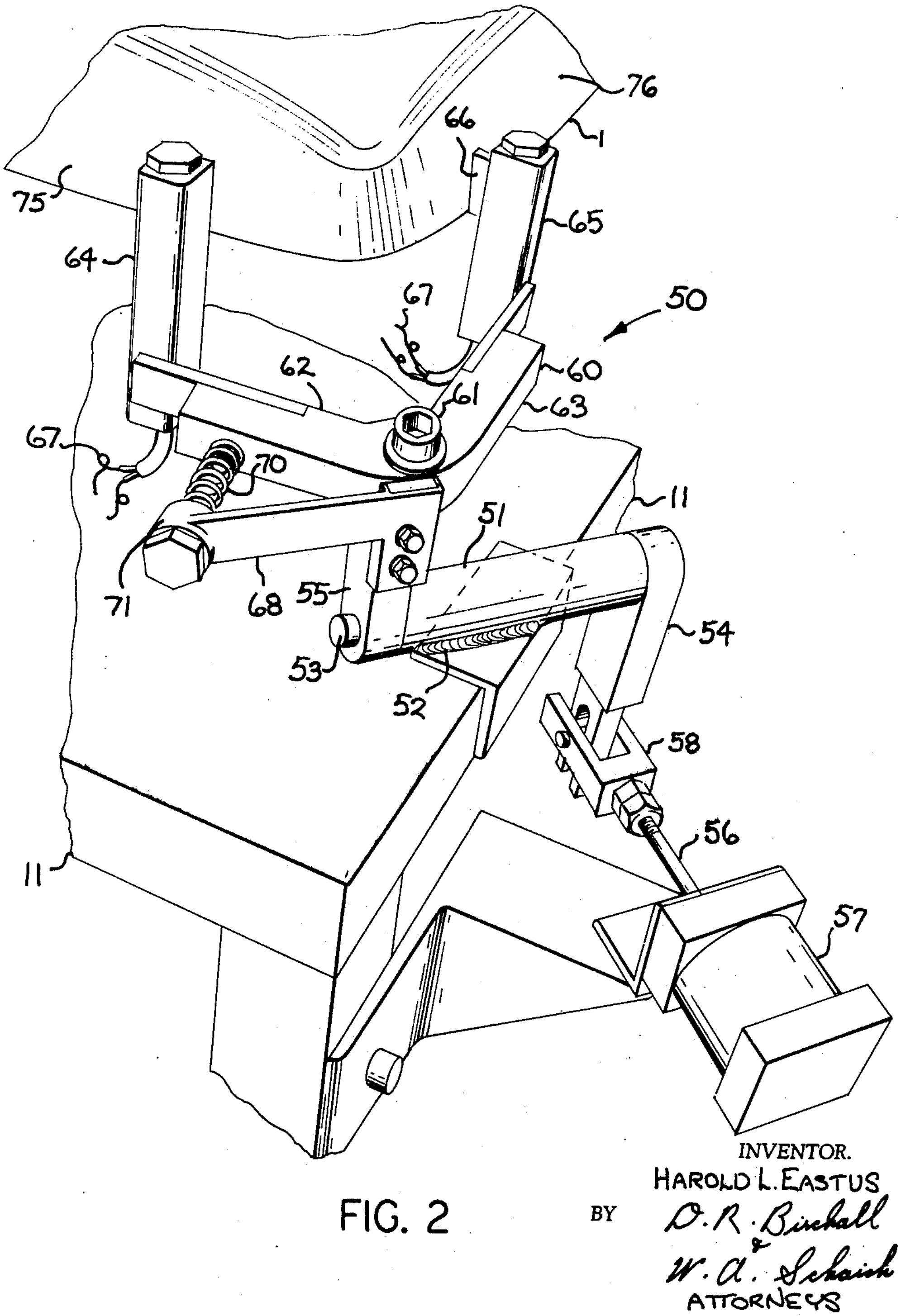

In the drawings:

FIG. 1 is a perspective view partly in section, looking down upon the top working surface of the television face plate holding fixture; and FIG. 2 is a perspective view showing the alignment mechanism which translates and immobilizes the face plate.

As has been mentioned heretofore, the present invention as described in this specification is applicable to the manufacture of the face plate member of a color television picture tube envelope; however, it would be apparent to those well versed in the art of glass to metal sealing that the invention is equally applicable to the manufacture of many different glass component parts that find use in other electron discharge devices that require metal or ceramic inserts sealed thereinto in precise alignment for load supporting applications or electrical considerations.

In achieving the desired results of the present invention, it is desirable that the television face plates be in the range of about 900° to 1000° F. which corresponds to near or slightly above the annealing point temperature of the glass. The face plate may be selected for stud insertion just after it has been pressed or it may be permitted to cool and subsequently be preheated to the desired working temperature. The entire face plate may be heated to the required temperature for stud insertion; however, if desired, localized areas of the flange portion in the area where the studs are to be inserted may be heated locally to the indicated annealing temperature. The heating or preheating of the face plate is desirable to eliminate or reduce thermal shock in those areas of the face plate flange where the heated inserts are forced in to the glass.

Referring to the drawings and particularly to FIG. 1, which is perspective view, a television face plate 1 is shown as it rests in a substantially horizontal position upon the apparatus 10 of the present invention. The apparatus 10 comprises a generally planar table-like top member that is supported by conventional means (not shown) and which will be hereinafter referred to as table 11. Television face plate 1 is held so that its viewing surface is horizontal and the flanged edge thereof is turned in a downward direction. While in the above described position, heat is applied to strategically located positions and metal support buttons or studs are forced into sealing engagement with the interior wall of the flange portion of the face plate.

Once again referring to FIG. 1, and in more detail, support columns 12 and 13 extend in an upward direction from the top of table 11 and are anchored thereto by suitable means not shown. Attached to the upper ends of support columns 12 and 13 and oriented generally normal to the top of table 11 are hollow cylindrical sections 14 that contain on the uppermost end contoured buttons 15. The buttons 15 are made from carbon or cast iron or any other heat conducting, non-marring material. In order to conform closely to the surface of the glass which they must support, buttons 15 are flat on their top surfaces and may rotate freely in any direction to accommodate the interior surface of a television face plate. Hollow cylindrical sections 14 each contain an electrical heating element (not shown) so that buttons 15 will more nearly match the temperature of the glass article which they support. For all practical purposes and as depicted in FIG. 1, support columns 12 and 13 are identical and are arranged at diametrically and diagonally opposite sides of table 11.

A central post structure 16 is mounted in upright fashion from the top of table 11. The top of post 16 is machined so that a check fixture can be referenced therefrom in order to determine whether the studs are being installed at the proper location and at the proper angle with respect to the flange of face plate 1. In addition to serving as a reference point, post 16 continues downward through the table 11 and forms a spindle 17 below the table top. Spindle 17 terminates with threaded terminal 18. A centrally apertured yoke 20 is slidably positioned over spindle 17 and is biased in an upward direction by the force exerted on the underside thereof by compression spring 21. Compression spring 21 is adjustably engaged in abutting relationship with nut 22 which can move freely up and down the threaded terminal 18 of spindle 17. At the extremities of yoke 20 support shafts 23 and 24 are cantilevered in an upward direction and pass through suitable openings 25 in table 11. Brackets 26 and 27 are respectively attached to the uppermost ends of shafts 23 and 24 and in turn support vertically aligned cylindrical sections 30 and 31. Cylindrical sections 30 and 31 are for all practical purposes the same as rigidly fixed cylindrical sections 14. Electrical heating elements (not shown) are also employed in cylindrical sections 30 and 31 in order to heat buttons 32.

During the operation of the present invention, a television face plate such as 1, FIG. 1, is positioned in an inverted position on diagonally positioned upright supports 14. Thus it is evident that if face plate 1 were supported only by diagonally positioned supports 14, the face plate would be free to tilt or rotate about a line or axis extending from the centers of movable support buttons 15. In so rotating about the aforementioned axis, the interior surface of the face plate comes in contact with one of support buttons 32 which are mounted on the extremities of coacting cantilevered support shafts 23 and 24. The direction of rotation of face plate 1 about an axis from the tops of supports 14 is stopped immediately as soon as the interior of face plate 1 initially contacts either one or the other of support buttons 32. The direction of rotation of face plate 1 about an axis extending from the tops of support columns 14 is reversed under an upwardly biasing force supplied by the first support button 32 that contacts the interior surface of face plate 1. As face plate 1 finally comes to rest in a seated position upon support buttons 14 and 32, it is stabilized by a four-point contact and all tilting and rotation ceases. The upward biasing force of buttons 32 is supplied by adjusting nut 22 against or away from spring 21 on spindle 17. The partial weight of the face plate 1 and yoke 20 can be offset by the upward force applied through spring 21. The initial adjustment of the force exerted by spring 21 need be accomplished only once for a face plate of a given weight. The upward force applied through yoke 20 should be enough to level the face plate 1, but not great enough to lift the entire face plate 1. Once face plate 1 has been arranged in a generally horizontal attitude with the peripherally extending flange thereof pointed in a downwardly direction, it is then ready for a lateral, fore and aft centering. To facilitate the initial positioning of face plate 1 upon the overall apparatus 10, guide posts 33 comprised of a relatively soft exterior coating of a material such as for example, Teflon, are vertically mounted from table 11. The face plate 1 is then positioned by the operator, so that the exterior surface of the flange contacts the guide posts 33. The face plate is then lowered onto buttons 15 and 32 where it is oriented in a horizontal position by the heretofore described action of yoke 20 and its associated parts.

Located diametrically opposite from guide posts 33 are flange supports 34, 35, and 36. Flange supports 34 and 35 are positioned along the side of the face plate coinciding with the major axis thereof and flange support 36 is positioned so as to contact one of the flanges that is generally normal to the major axis or long direction of the face plate. The flange supports contain electrical heating elements and are tipped with movable heat conducting buttons 37 which are similar to buttons 15 and 32 heretofore described. As can be seen in FIG. 1 supports 34, 35, and 36 are mounted in a secure manner (actual attachment not shown) from the top surface of table 11.

Diagonally across the face plate 1 from flange supports 35 and 36 is a centering mechanism shown generally at 50. Reference is now made to FIG. 2 which shows a perspective view of centering mechanism 50 when viewed from the back side of apparatus 10. Horizontally disposed table 11 is shown along with a broken away portion of face plate 1. Face plate 1 is also in a horizontal position as it would be when its interior surface rests upon the support provided by buttons 15 and 32. A shaft support member 51 is anchored in a secure manner to the top of table 11 as shown by weld 52. A shaft 53 is journaled in support member 51 and has attached respectively to the outer ends thereof a downwardly extending arm 54 and an upwardly extending arm 55. The downwardly extending arm 54 is adapted for receiving the coupling 58 which is in turn affixed to the movable rod 56 of actuator 57. Arm 55, previously mentioned, extends in an upward direction and has movably affixed to the top end a bifurcated member 60. Bolt 61 serves as a fastening means to anchor bifurcated member 60 to the top end of arm 55. Thus, it can be seen that member 60 has two outstanding arms 62, 63 that move in unison about the pivot point formed by bolt 61. At the extremities of arms 62 and 63 are vertically aligned flange supports 64 and 65 which have movable heat conducting buttons such as 66 attached to the upper ends. Electrical heating elements are utilized with supports 64 and 65 and the electrical connections are shown at 67.

Returning to arm 55 which is rigidly attached to shaft 53, a spring support rod 68 is cantilevered from arm 55 and extends generally in the same direction as arm 62. A compression spring 70 is held at one end by spring retainer 71 and abuts against the side of arm 62.

As has been commented upon supra, during the operation of the present apparatus a television face plate is positioned flange downward upon the assembly 10 whereupon it is immediately brought into horizontal alignment by the combined action of fixed supports 14 and movable supports 26, 27. The face plate has been purposely guided onto the assembly 10 by having it slide against posts 33 as it settles into horizontal alignment. This procedure of setting the face plate on assembly 10 prevents the flange of the face plate from becoming chipped because of contact with flange supports such as 34, 35, and 36. The apparatus 10 through an automatic sequence timer (not shown) and appropriate fluid drive causes actuator 57 to move shaft 53 within its support member 51 thus causing support arms 64 and 65 to swing toward the exterior flange of the face plate 1. Support 64, because of the thrust imposed upon it by compression spring 70 will first contact the back flange area 75 of face plate 1. Before the face plate 1 is urged in a forward direction or moved, the force exerted by spring 70 will be overcome thus permitting arms 62 and 63 to rotate. The rotation of arms 62 and 63 thus permits support 65 to come into contact with side flange area 76. With both supports 64 and 65 in contact with flange areas 75 and 76 respectively, the face plate will be moved generally in a diagonal direction, thus causing it to be pushed firmly against the two front flange supports 34, 35 and side flange support 36. During the normal sequence of operation, the face plate 1 is pushed laterally until it contacts fixed flange supports 34, 35, and 36. Actuator 57 is then reversed thus causing supports 64 and 65 to be withdrawn from contact with the flange areas of face plate 1. Thereafter, support arms 64 and 65 are once again brought to bear against the face plate. The temporary release of the face plate 1 from the firm grasp of apparatus 10 permits better alignment to be achieved prior to the insertion of the metallic studs.

Referring now to FIG. 1 there are shown three stud heating transformers 80, 81, and 82. A metal stud 83 can be seen in the left hand transformer 80. The stud insertion transformers utilize a high frequency current to induce heat in the metallic stud. After the stud is heated to the desired temperature, it is translated until it contacts the interior surface of the face plate flange. Continued heating and force applied to the stud causes the surrounding glass to become fluid enough to permit the stud to penetrate the glass wall of the face plate flange. After the stud has achieved its required penetration of the glass, the flow of heat into the stud is stopped and the stud is subsequently released from the grasp of the transformer.

The entire sequence of operation and movement of the transformers 80, 81, and 82 have been omitted since their electrical, pneumatic and vacuum interconnections are either the subject matter of copending patent applications or are well known to those skilled in the art.

From the above specification it becomes evident that there has been described an apparatus that can, by external chucking, accurately position a television face plate so that metal inserts can be precisely located in the flange thereof.

While certain representative embodiments and details have been shown for the purpose of illustrating the invention, it will be apparent to those skilled in this art that various changes and modifications may be made therein without departing from the spirit or scope of the invention.

What is claimed is:

1. An apparatus for orienting a concavo-convex flanged article in precise alignment to facilitate the joining of an insert into an integral relationship with said article, said apparatus comprising;

a generally horizontal support table having a plurality of upstanding support members affixed thereto and adapted to support said article by its interior surface, a plurality of upstanding support members attached to said apparatus and arranged to move in a direction generally perpendicular to said table for orienting and partially supporting said article, a plurality of flange supports attached to said apparatus and in spaced array exteriorly of said upstanding support members and adapted to contact the periphery of the flange of said article, at least some of said flange supports being capable of movement to translate said article into engagement with all of said flange supports, and means attached to said apparatus for effecting the movement of at least some of said flange supports.

2. An apparatus for orienting a hollow glass face plate panel of a cathode-ray picture tube envelope, said apparatus comprising, a generally planar support structure having a plurality of support members fixedly attached thereto and adapted to support the inner surface of the viewing area of said face plate panel, a plurality of support members movably attached to said support structure and adapted to level and partially support said face plate in a generally horizontal attitude, a plurality of flange supports attached to said support structure and positioned exteriorly about the periphery of the face plate flange, and means for moving at least some of said flange supports whereby the face plate is translated to a position where it engages all of said flange supports.

3. An apparatus as claimed in claim 2 wherein at least two of said movable support members are attached to a common member thus causing them to move in unison.

4. An apparatus as claimed in claim 3 wherein said common member is an apertured yoke assembly slidably mounted to said apparatus and coupled with urging means to offset the weight of said assembly and also a portion of the weight of said face plate.

5. An apparatus as claimed in claim 2 wherein guide means are positioned on said apparatus so as to facilitate the initial orienting of a face plate thereon.

6. An apparatus as claimed in claim 2 wherein at least two of said flange supports are attached to a common arm and are adapted for curvilinear motion thus permitting the translation and immobilization of a face plate in a horizontal direction.

7. An apparatus as claimed in claim 6 wherein said arm is rotated by urging means so that one of said flange supports is in a position to contact the face plate prior to the contact with the face plate of the other of said flange supports.

8. An apparatus as claimed in claim 2 wherein stud holding and heating means are movably attached to said apparatus for accurately inserting studs in the flange portion of the face plate.

9. In the manufacture of cathode-ray tubes, the method of fabricating a glass face plate panel for subsequent assembly in a shadow-mask type cathode-ray image tube for color television, said method comprising the steps of;

(1) positioning the face plate with the flanged portion thereof aligned substantially in a vertical direction, (2) moving the face plate in a lateral direction so that it is in precise alignment for the reception of inserts in the flange thereof, (3) immobilizing the face plate in a lateral direction by contacting only the exterior surface of the flange at a plurality of strategically located positions, (4) heating at least one stud and an area of the face plate flange immediately adjacent said stud, (5) pressing the stud into sealing engagement with the flange of the face plate, and (6) removing the face plate from the confinement of its exteriorly held position.

10. A method as set forth in claim 9 wherein the flanged section of the face plate is oriented in the downward direction.

11. A method as set forth in claim 9 wherein the face plate is supported in a vertical direction by contacting the interior surface of the viewing portion of the face plate.

12. A method as set forth in claim 9 wherein the face plate is annealed subsequent to the installation of said stud.

13. A method as set forth in claim 9 wherein a first set of movable external flange contacts are utilized to translate the face plate into contact with a second set of fixed external flange contacts.

14. A method as set forth in claim 13 wherein said face plate is cooled while within the confinement of said external flange contacts.

References Cited

UNITED STATES PATENTS

| | | | |
|---|---|---|---|
| 3,021,643 | 2/1962 | Blanding et al. | 65—155 |
| 3,187,404 | 6/1965 | Fiore | 29—25.15 |
| 3,274,662 | 9/1966 | Jackman et al. | 29—25.19 |

ARTHUR D. KELLOGG, Primary Examiner

U.S. Cl. X.R.

29—25.15, 25.19, 25.2; 65—112, 139, 154, 155